United States Patent [19]

Kasperkovitz

[11] B 3,919,469

[45] Nov. 11, 1975

[54] SENSOR PROVIDED WITH A PICK-UP PANEL

[75] Inventor: Wolfdietrich Georg Kasperkovitz, Eindhoven, Netherlands

[73] Assignee: U.S. Philips Corporation, New York, N.Y.

[22] Filed: Feb. 22, 1973

[21] Appl. No.: 334,868

[44] Published under the Trial Voluntary Protest Program on January 28, 1975 as document no. B 334,868.

[30] Foreign Application Priority Data

Mar. 4, 1972 Netherlands ....................... 7202906

[52] U.S. Cl. ............................................... 178/7.1
[51] Int. Cl.[2] ............................................ H04N 3/16
[58] Field of Search ........ 178/7.1, 7.3 D; 250/211 J, 250/553; 340/166, 324 M

[56] References Cited

UNITED STATES PATENTS 3,562,418 2/1971 Glusick ............................... 178/7.1
3,660,667 5/1972 Weimer .......................... 250/211 J

*Primary Examiner*—Richard Murray
*Attorney, Agent, or Firm*—Frank R. Trifari; Simon L. Cohen

[57] ABSTRACT

A sensor including a pick-up panel having photosensitive transistors whose emitters are connected to column conductors and whose collectors are connected to row conductors. The row conductors are connected to emitters of row selection transistors whose bases are connected to outputs of a row scanning generator and whose interconnected collectors are connected to an output circuit. The column conductors are directly connected to a column scanning generator. The influence of parasitic capacitances is eliminated by causing the output circuit to provide a constant voltage, by always impressing voltage on the column conductors and by switching over the row selection transistors in a signal blanking period.

9 Claims, 6 Drawing Figures

SENSOR PROVIDED WITH A PICK-UP PANEL

Figure 1:
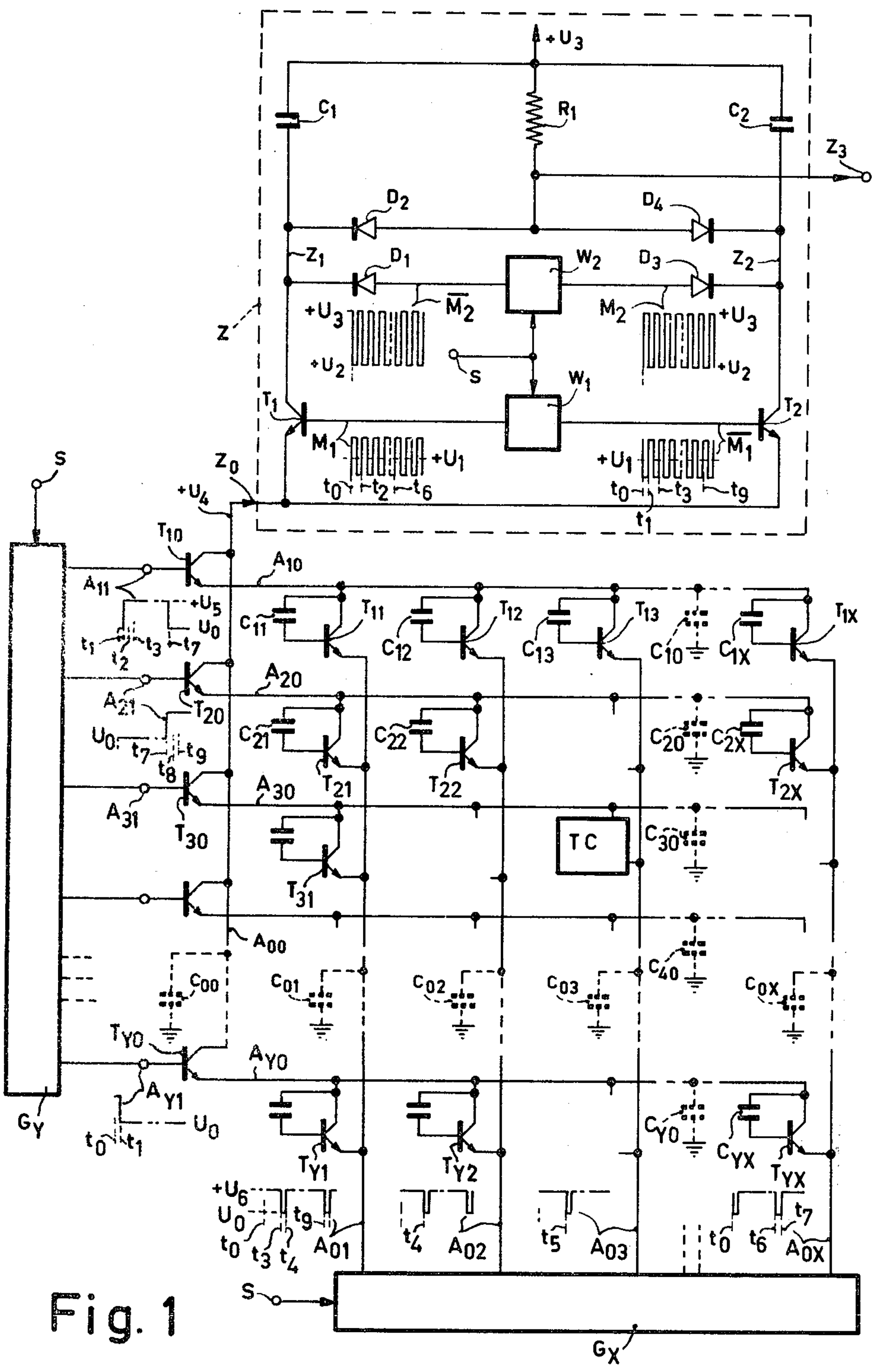

The invention relates to a sensor provided with a pick-up panel formed with a cross-bar system of row and column conductors and pick-up elements occurring between intersections, said conductors being connected to outputs of row and column scanning generators each applying successive pulses with a reference voltage to the outputs, said panel being connected to an output circuit for applying an output signal to an output of the sensor through a row and column selection, the outputs of the row-scanning generator being connected to bases of transistors whose emitters are each connected to a row conductor.

A sensor of this kind has been described in an Article in the "I.E.E.E. Journal of Solid-State Circuits" of December 1969, on pages 326 to 333. Fields of application of the sensor formed with photosensitive pick-up elements may be, for example, television cameras, optical readers for computers and character recognition devices.

It has been stated that the output circuit is coupled to the column conductors and this through a number of transistors which are each formed with an insulated gate electrode, such as field-effect transistors. The transistors in the output circuit are alternatively rendered conducting by pulses applied by the column scanning generator to the gate electrodes.

The Article states that a locally strong exposure causes a considerable cross-over to proximate pick-up elements.

Furthermore, when using the field-effect transistors operating as switches in the output circuit, these transistors each have a considerable resistance in their conducting condition, which resistances mutually have a given spread. When reproducing the output signal provided by the sensor the spread in these resistances becomes manifest as stripes located in the column or vertical direction.

The use of bipolar photo transistors in the pickup panel and field effect transistors in the output circuit requires two different technologies in case of a structure in one and the same semiconductor body, which is a drawback for the value of the output because the number of process stages is increased.

In the desired embodiment of the sensor crossover phenomena between the various pick-up elements caused by parasitic couplings and capacitances occur to a more or less strong extent in the output signal and transient phenomena caused by the row and column selection are disturbingly noticeable.

An object of the invention is to realize a sensor in which the disturbing transient phenomena and cross-over are reduced to a strong extent in the output signal and to this end the sensor according to the invention is characterized in that the interconnected collectors of the said transistors connected to the row scanning generator are connected to the output circuit.

A further reduction of interference is possible in a sensor provided with pick-up elements formed with a photosensitive transistor whose emitter is connected to one of the column conductors and whose collector is connected to one of the row conductors, and which is characterized in that the outputs of the column scanning generator convey a determined voltage cutting off the said transistors in the temporary absence of the said pulse with the reference voltage.

A further reduction of interference is possible in a sensor which is characterized in that the said interconnected collectors are connected to an emitter of at least one transistor present in the output circuit, the base of said transistor being connected to a bias source and its collector being coupled to the output of the sensor.

The proposed structure of the sensor eliminates the influence of parasitic capacitances. This is the case for the row conductors by maintaining the voltage across the row conductor through the said transistor connected thereto constant in a selected row employing high frequency switching between the columns, and as regards the column conductors, by impressing a voltage on these conductors even when the pulse with the reference potential is absent; none of the column conductors may be free. A further elimination is realized by causing the transistor in the output circuit to apply a constant volage to the interconnected collectors of the transistors being connected to the row conductors and bringing about the low-frequency switching between the row conductors. Due to the said steps cross-over and transient phenomena no longer occur disturbingly noticeable in the output signal of the sensor.

Figure 2:
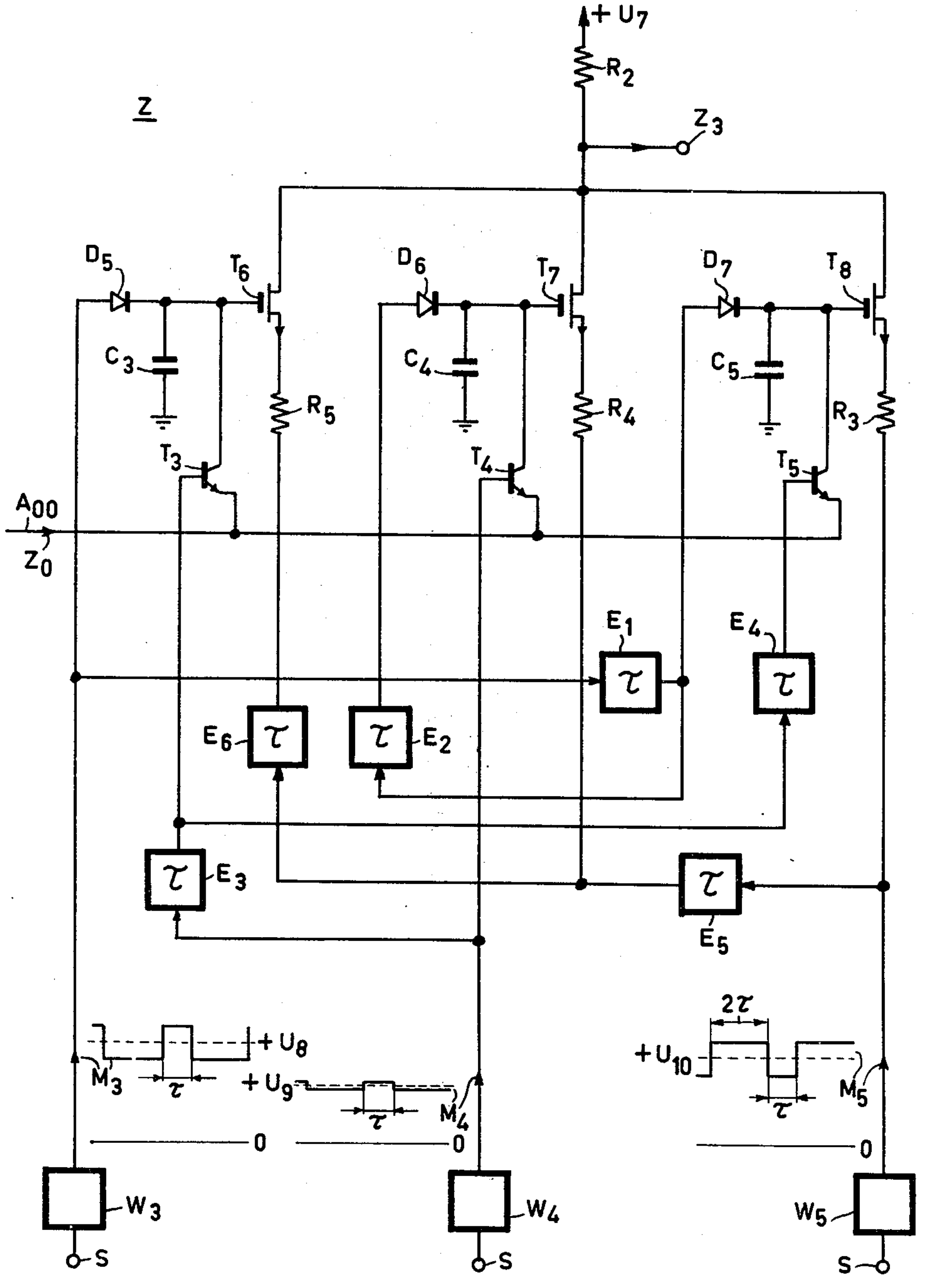
Figure 3A:
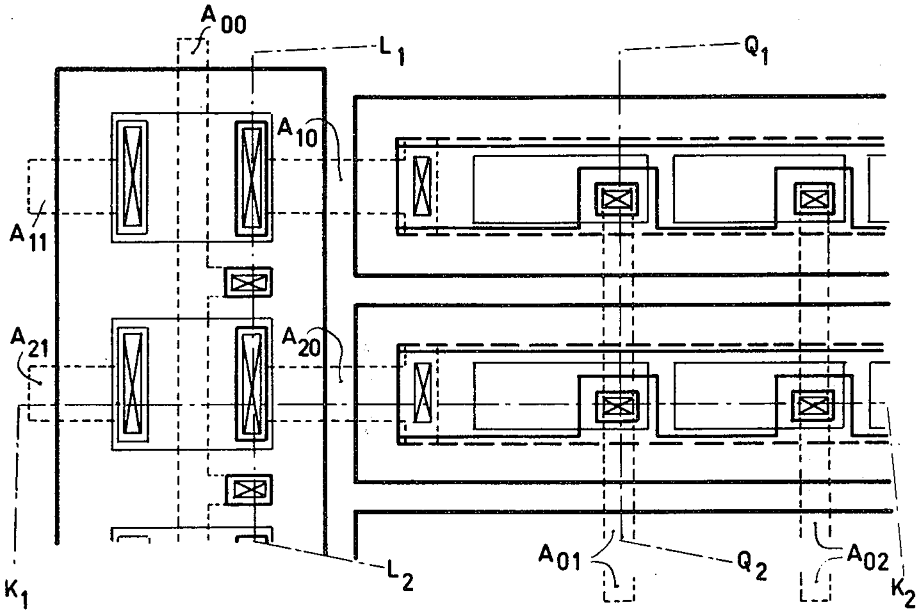
Figures 3B, 3C, 3D:
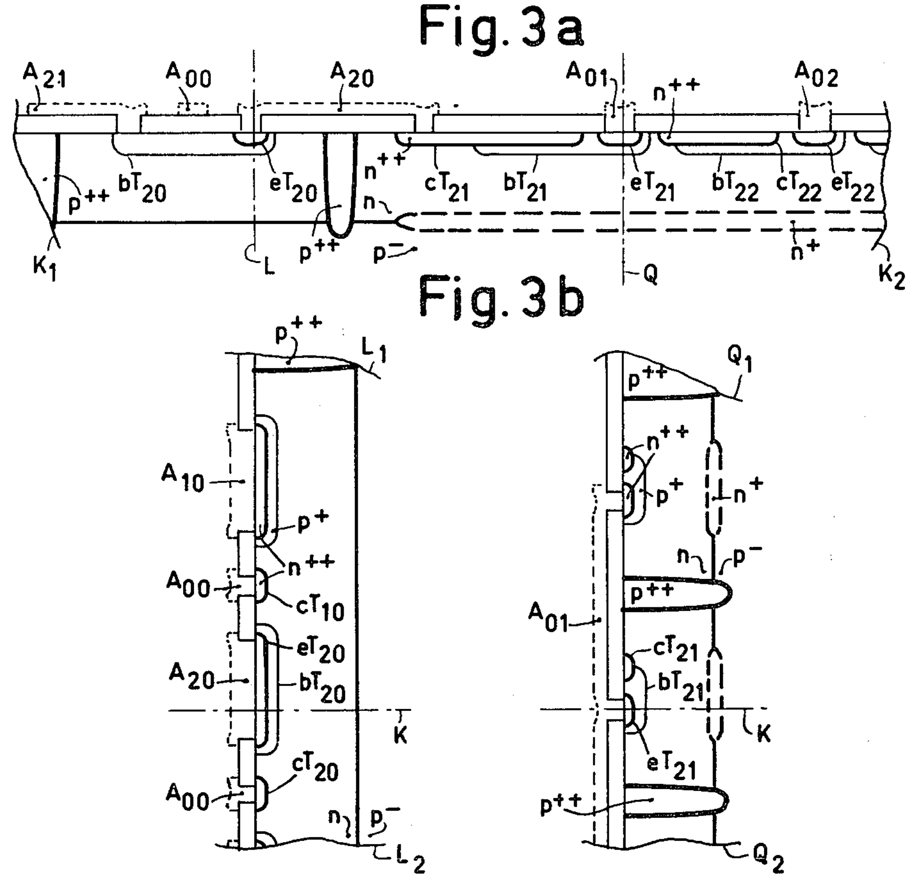

The invention will be described in greater detail with reference to the following Figures as examples in which:

FIG. 1 shows a switching circuit diagram of a sensor according to the invention, FIG. 2 shows a second embodiment of an output circuit suitable for this sensor according to the invention, and FIGS. 3*a* and 3*d* show the structure of a pick-up panel present in the sensor according to FIG. 1 in a semiconductor body.

In the sensor shown in FIG. 1 according to the invention row and column conductors constituting a cross-bar system are successively denoted by $A_{10}$, $A_{20}$, $A_{30}$, . . . $A_{Y0}$ and $A_{01}$, $A_{02}$, $A_{03}$, . . . $A_{0X}$. The references $A_{01}$, $A_{02}$, $A_{03}$ and $A_{0X}$ not only denote the column conductors but also the signals which they convey as they are connected to outputs of a column scanning generator denoted by $G_X$. The row conductors $A_{10}$, $A_{20}$, $A_{30}$ and $A_{Y0}$ are connected to emitters of transistors $T_{10}$, $T_{20}$, $T_{30}$ and $T_{Y0}$, respectively, whose bases are connected through connections with some signals shown $A_{11}$, $A_{21}$, $A_{31}$ and $A_{Y1}$ to outputs of a row scanning generator $G_Y$. To obtain a coupling between the instants when the said signals $A_{11}$ . . . $A_{Y1}$ and $A_{01}$ . . . $A_{0X}$ occur there has been shown that a synchronizing signal S is applied to the generators $G_Y$ and $G_X$. The signal S may be, for example, a television synchronizing signal. X denotes the number of image spots constituting a television line and Y is the number of lines constituting a television image. Interlacing is possible in this case.

The collectors of the transistors $T_{10}$, $T_{20}$ . . . $T_{Y0}$ are connected together and are connected through an output conductor $A_{00}$ to an input $Z_0$ of an output circuit Z and are connected therein to the emitters of two transistors $T_1$ and $T_2$. The bases of the transistors $T_1$ and $T_2$ are connected to two outputs of a voltage source $W_1$. The synchronizing signal S is applied to the source $W_1$ and under its control the source $W_1$ provides a voltage $M_1$ and $M_1$ which is composed of a bias having a value of $+U_1$ and a square-wave varying alternating voltage. The square-wave alternating voltage occurs in the voltages $M_1$ and $M_1$ in phase opposition and the result is that the transistors $T_1$ and $T_2$ are alternately conducting and cut off.

Furthermore the output circuit Z is provided with a second voltage source $W_2$ synchronized by the signal S and providing voltages $M_2$ and $M_2$. It has been shown for the voltages $M_2$ and $M_2$ that they have a square-wave variation in phase opposition between the values of $+U_2$ and $+U_3$. The voltage $M_2$ is applied to the anode of a diode $D_1$ whose cathode is connected to the collector of the transistor $T_1$. The connection point of the diode $D_1$ and the transistor $T_1$ denoted by $Z_1$ is connected through a capacitor $C_1$ and in parallel therewith a series arrangement of a diode $D_2$ and a resistor $R_1$ to a connection which conveys a direct voltage of the value $+U_3$. In the same manner the output of the source $W_2$ conveying the voltage $M_2$ is connected through a diode $D_3$ to the collector of the transistor $T_2$ and a connection point $Z_2$ thus formed is connected through a capacitor $C_2$ and a diode $D_4$ in series with the resistor $R_1$ to the connection conveying the direct voltage $+U_3$. The direct voltage $+U_3$ may be derived in a manner not shown from a supply source connected to ground which, for example, also feeds the source $W_2$. The junction of the resistor $R_1$ and the diodes $D_2$ and $D_4$ is connected to an output of the sensor according to FIG. 1 denoted by $Z_3$.

To explain the operation of the output circuit Z the following applies. It is assumed that the points $Z_1$ and $Z_2$ both convey a voltage which is equal to the voltage $+U_3$ minus a diode threshold voltage $U_D$ which occurs, inter alia, across the diodes $D_1 \ldots D_4$. The voltage $+U_3$ occurs at the output $Z_3$. It is found from the voltages $M_1$ and $M_1$ shown in FIG. 1 that in case of cyclical operation always one of the transistors $T_1$ and $T_2$ conducts and the other is cut off while it follows from the voltages $M_2$ and $M_2$ that the same applies to the diodes $D_3$ and $D_1$. When the transistor $T_1$ becomes conducting at an instant $t_0$ denoted for the voltage $M_1$ at which the diode $D_1$ is blocked and when the input $Z_0$ takes up some current during a short period, it is derived through the transistor $T_1$ from the capacitor $C_1$. The voltage at point $Z_1$ thereby decreases while a negligible leakage current flows through the resistor $R_1$ and the diode $D_2$ to the point $Z_1$. The voltage drop across point $Z_1$ likewise occurs at the output $Z_3$.

Subsequently the transistor $T_1$ and the diode $D_3$ are blocked at an instant $t_1$ under the control of the voltages $M_1$ and $M_2$ and under the influence of the voltages $\overline{M}_1$ and $\overline{M}_2$ the transistor $T_2$ and the diode $D_1$ become conducting. The source $W_2$ applies the voltage $+U_3$ to the diode $D_1$ so that the voltage at point $Z_1$ immediately increases to the voltage $+U_3 - U_D$ while the voltage $U_D$ occurs across the diode $D_1$. The output $Z_3$ would thereby start to convey the voltage $+U_3$ if it were not for the input $Z_o$ taking up some current in a short time in case of the conducting state of the transistor $T_2$, which current, derived from the capacitor $C_2$, causes the voltage at point $Z_2$ and hence at the output $Z_3$ to decrease.

When subsequently the transistor $T_1$ and the diode $D_3$ become conducting at an instant $t_2$, described effect is repeated.

Two important points for the output circuit Z are the following:

Since either transistor $T_1$ or transistor $T_2$ always conducts, the input $Z_o$ conveys a more or less constant voltage $+U_4$. When, for example, there applies that the voltage $+U_1$ is equal to +5V, the voltage $M_1$ varies between 5 ± 0,3 V and the base-emitter voltage drop which is as large as the voltage $U_D$ is equal to 0.7 V, the input $Z_o$ conveys a voltage $U4 = 4.6$ V. The source $W_1$ is then active as a bias source for the conducting transistor $T_1$ or $T_2$.

Together with the transistor $T_1$ and through the diode $D_1$ with the source $W_2$, the capacitor $C_1$ constitutes an integrator ($C_1$, $T_1$, $W_2$). The source $W_2$ is active with the voltage $+U_3$ as a reference voltage source. Relative to the voltage $+U_3 - U_D$ at which the voltage $U_D$ occurs across the diode $D_1$, the connection point $Z_1$ has a voltage drop which is given by the current occurring at the input $Z_o$ and being integrated by capacitor $C_1$. In this case the maximum voltage drop given by the integrated current must not exceed the value ($U_3$–$U_2$) because otherwise the diode $D_1$ may start to conduct in an unwanted manner in case of the transistor $T_1$ conducting. In the same manner the capacitor $C_2$, the transistor $T_2$ and the source $W_2$ connected thereto through the diode $D_3$ constitute a second integrator ($C_2$, $T_2$, $W_2$). For the given voltages there may apply that reference voltage $U_3 = 10$V and that voltage $U_2$ is approximately equal to 7V.

The advantages of the output circuit Z are apparent from the further description of the pick-up panel connected to the input $Z_o$ with pick-up elements TC occurring between intersections. npn-transistors $T_{11} \ldots T_{YX}$ are connected to the intersections between the row conductors $A_{10} \ldots Y_{Y0}$ and the column conductors $A_{01} \ldots A_{0X}$. The collector of each of the transistor $T_{11} \ldots T_{YX}$ is connected to one of the row conductors $A_{10} \ldots A_{Y0}$ and the emitter is connected to one of the column conductors $A_{01} \ldots A_{0X}$. The transistors $T_{11} \ldots T_{1X}$; $T_{21} \ldots T_{2X}$; $T_{Y1} \ldots T_{YX}$ constitute rows and the transistors $T_{11} \ldots T_{Y1}$; $T_{12} \ldots TY_2$; $T_{11} \ldots T_{YX}$ constitute columns. The bases of the transistors $T_{11} \ldots T_{YX}$ are connected through capacitors $C_{11} \ldots C_{YX}$ to the collectors and are further not connected. The capacitors $C_{11} \ldots C_{YX}$ may be, for example, capacitors having a photosensitive dielectric, but in a practical form they will be given by the photosensitive base-collector junction occurring in the transistors $T_{11} \ldots T_{YX}$ and being in a cut-off condition.

The row and column conductors $A_{10} \ldots A_{Y0}$ and $A_{01} \ldots A_{0X}$ have parasitic capacitances occurring mutually and to ground which are distributed along the conductors but are indicated in FIG. 1 by a single capacitor $C_{10} \ldots C_{Y0}$ and $C_{01} \ldots C_{0X}$ to ground. The output conductor $A_{00}$ also has a distributed parasitic capacitance which is indicated by a capacitor $C_{00}$ to ground. In the sensor according to the invention the parasitic capacitances $C_{10} \ldots C_{Y0}$, $C_{01} \ldots C_{0X}$ and the capacitor $C_{00}$ which normally cause an interference in the form of transient phenomena and cross-over in the output signal of the pick-up panel will not cause only interference.

To explain the operation of the sensor according to FIG. 1 it is assumed that the capacitors $C_{11} \ldots C_{YX}$ constituted by the cut off base-collector junction in the transistors $T_{11} \ldots T_{YX}$ are irradiated by light after having been charged to a reference voltage to be described hereinafter. The photons of the light produce hole-electron pairs in the semiconductors layers of the transistor $T_{11} \ldots T_{YX}$. Dependent on the intensity of the local exposure the hole-electron pairs generated near the base-collector junction discharge the capacitors $C_{11}$ . . . $C_{YX}$ occurring at that area. At an instant $t_3$ shown in FIG. 1 the following applies: it has been stated for the signal $A_{11}$ that at the instant $t_3$ the base of the transistor $T_{10}$ provides a volatge $+U_5$ while it is apparent from the signals $A_2$ and $A_{Y1}$ that the bases of the transistors $T_{20}$ . . . $T_{Y0}$ have a voltage $U_0$. The voltage $U_o$ may be the ground potential, hence $U_0 = 0V$. It is found from the signals $A_{01}$ . . . $A_{0X}$ for the column conductors that at the instant $t_3$ a voltage $+U_6$ occurs across the column conductors. For, for example, $U_5 = 3.7$ V and $U_6 = 3V$ none of the transistors $T_{11}$ . . . $T_{1X}$ can conduct. At the instant $t_3$ a pulse with $U_0 = 0V$ lasting until the instant $t_4$ occurs in the signal $A_{01}$. The result is that with 0V across the column conductor $A_{01}$ and $U_5 = 3.7$ V across the connection $A_{11}$ the transistors $T_{10}$ and $T_{11}$ become conducting. The capacitor $C_{11}$, for example partly discharged by the photons is quickly charged through the collector-emitter path of the transistor $T_{10}$ until the condition is achieved at which the capacitor $C_{11}$ has a voltage of $U_5$ minus the base-emitter voltage drops of the transistors $T_{10}$ and $T_{11}$, that is to say, up to $U_5 - 2U_D = 2.3$ V. The charge required therefor is derived through the transistor $T_2$ controlled by the voltage $M_1$ from the capacitor $C_2$. When, for example, the capacitor $C_{11}$ is discharged by the photons with 2V and when there applies that $C_{11} = 1.4$ pF while for a current amplification factor $\beta$ of the transistor $T_{11}$ there applies that $\beta = 100$, a charge of approximately $2 \times 1.4 \times 100$ picocoulomb is transported through the transistor $T_{10}$. For a value of the capacitor $C_2 = C_1 = 100$ pF it follows that the voltage across the capacitor $C_2$ becomes 2.8 V. As a result the voltage at the output $Z_3$ of the sensor decreases from $U_3 = 10V$ to $10-2.8 = 7.2$ V. This voltage of 2.8 V occurs, for example, in case of a maximum exposure of the capacitor $C_{11}$.

The charge transport to the capacitor $C_{11}$ is effected very quickly because the resistance is negligible in the charge circuit with the capacitor $C_2$, the transistors $T_2$, $T_{10}$ and $T_{11}$ and the conductor $A_{01}$. When the capacitor $C_{11}$ has been charged to substantially the reference voltage with the value 2.3 V, the transistors $T_2$ and $T_{10}$ which are capable of remaining conducting under the influence of the voltages across the bases will convey a very low current until the instant $t_4$ at which the reference voltage is approximated up to a few millivolts.

At the instant $t_4$ the pulse in the signal $A_{01}$ ends and a pulse in the signal $A_{02}$ commences. The transistor $T_2$ is then cut off under the control of the voltage $M_1$, while the voltage $M_1$ renders the transistor $T_1$ conducting. The result is that the capacitor $C_{12}$ is switched in a charge circuit which comprises the capacitor $C_1$, the transistors $T_1$, $T_{10}$ and $T_{12}$ and the column conductor $A_{02}$. In the manner described a voltage drop occurs at the output $Z_3$ which drop is determined by the discharge of the capacitor $C_{12}$ effected therebefore. Simultaneously the voltage source $W_2$ provides the reference voltage $U_3 - U_D$ through the diode $D_3$ for the connection point $Z_2$. When subsequently at an instant $t_5$ a pulse occurs in the signal $A_{03}$ while that in the signal $A_{02}$ drops out, the charge across the capacitor $C_{13}$ is implemented from the capacitor $C_2$.

For the last transistor $T_{1X}$ in the first row of transistors $T_{11}$ . . . $T_{1X}$ FIG. 1 shows that the capacitor $C_{1X}$ at an instant $t_6$ is connected through the transistor $T_1$ to the capacitor $C_1$. At an instant $t_7$ not only the pulse in the signal $A_{0X}$ ends, but also that in the signal $A_{11}$, while in the signal $A_{21}$ a pulse commences. At an instant $t_9$ a pulse in the signal $A_{01}$ commences so that the first capacitor $C_{21}$ in the second row of transistors $T_{21}$ . . . $T_{2X}$ is connected through the transistor $T_2$ to the capacitor $C_2$. Successively, the capacitors $C_{22}$ . . . $C_{2X}$ are connected to the output circuit Z. It has been indicated for the signal $A_{Y1}$ that at the instant $t_1$ the pulse ends while it follows from the signal $A_{0X}$ that the capacitor $C_{YX}$ is connected to the output circuit Z at the instant $t_0$ therebefore. Subsequently the next cycle of the successive connection of the capacitors $C_{11}$ . . . $C_{YX}$ to the output circuit Z begins at the instant $t_3$ via the row and column selection with the signals $A_{11}$ . . . $A_{Y1}$ with the reference voltage $+U_5$ and the signals $A_{01}$ . . . $A_{0X}$ with the ground potential $U_0$ as a reference.

In the description of the operation of the sensor according to FIG. 1 a signal blanking period such as the line and field blanking periods commonly used in television has been taken into account. During the blanking periods there is no video signal information and interferences in the output signal normally caused by the signal generation during these periods are later removed therefrom by clamping circuits. It has been indicated for FIG. 1 that after the switch-over at the instant $t_7$ of the first row conductor $A_{10}$ to the second row conductor $A_{20}$ the pulse in the signal $A_{01}$ does not occur immediately, but at the instant $t_9$. The time between the instants $t_7$ and $t_9$ may be considered as a line blanking period. For the sake of simplicity a duration is taken in this case in which otherwise two of the row capacitors $C_{11}$ . . . $C_{1X}$ would have been read out. In practice the line blanking period is approximately 18% of the line period. In the same manner a field blanking period follows because at the instant $t_1$ the pulse in the signal $A_{11}$ commences and that in the signal $A_{01}$ commences at the instant $t_3$. In practice the field blanking period amounts to some 20 line periods.

In the sensor according to FIG. 1 the instants $t_1$ to $t_3$, $t_7$ to $t_9$, etc. have been used in a favourable manner. Since during these instants transient phenomena may occur in the signal at the output $Z_3$, they are introduced therein deliberately, while the special structure of the sensor according to FIG. 1 ensures that transient phenomena do not occur outside the blanking periods. This has been achieved by connecting each of the row conductors $A_{10}$ . . . $A_{Y0}$ through the emitter of one of the transistors $T_{10}$ . . . $T_{Y0}$ to the interconnected collectors connected to the output circuit Z, while during the period when the column selection is successively effected the transistor (for examaple $T_{20}$) of the selected row conductor ($A_{20}$) has the reference voltage $+U_5$ at its base. The influence of the parasitic capacitor ($C_{20}$) which might give interfering transient phenomena in case of the high-frequency column selection is eliminated thereby. In fact, at the commencement of the row selection the free parasitic capacitor ($C_{20}$) is brought to the reference voltage $U_5 - U_D$ during the signal blanking period ($t_7$ to $t_9$) and the transient phenomenon caused thereby in the signal at the output $Z_3$ occurs in the manner admitted. Subsequently the transistor ($T_{20}$) remains conducting during the entire period of the subsequent column selections and it maintains the row conductor ($A_{20}$) and hence the parasitic capacitor ($C_{20}$) at the voltage $U_5 - U_D$. The selected transistor ($T_{20}$) conveys a pulsatorily varying current under the influence of the column selection.

For the purpose of illustration there applies that the capacitors $C_{10}$ . . . $C_{Y0}$ have a value of, for example, X times 0.5 pF for a construction to be further described with reference to FIG. 3 of the pick-up panel according to FIG. 1 integrated in a semiconductor body.

A further reduction of interference is obtained by causing none of the column conductors $A_{01} \ldots A_{0X}$ to be free in the described embodiment of the pick-up elements TC with photosensitive, bipolar transistors, but by always impressing a voltage on all column conductors. The voltage $U_6 = 3V$ across all column conductors $A_{01} \ldots A_{0X}$ but one ensures that relative to the row conductors $A_{10} \ldots A_{Y0}$, all but one of which are free, the base-emitter junctions of the part of the transistors $T_{11} \ldots T_{YX}$ present are cutoff under all circumstances. A simple reliable column selection has been obtained by using the base-emitter junctions of the transistors $T_{11} \ldots T_X$ when switching over between the columns.

For a pick-up element, for example ($T_{22}$, $C_{22}$) the following might be effected in case of a free row conductor $A_{20}$ and column conductor $A_{02}$. The capacitor $C_{22}$ charged to the reference voltage of 2.3 V which represents the cut-off base-collector junction of the npn transistor $T_{22}$ is discharged by the local exposure with its photon generated hole-electron pairs. Particularly the electrons generated in the n-collector and the holes generated in the p-base are of importance. In case of a strong local exposure, the base-collector junction may be completely discharged and is therefore no longer cut off. A further exposure continues to generate hole-electron pairs with its photons while subsequently the collector becomes active as an emitter. The transistor $T_{22}$ therefore becomes active in an inverse manner. A negative voltage is present across the column conductor $A_{02}$ and the parasitic capacitor $C_{02}$ due to a leakage current flowing through the likewise photosensitive capacitor $C_{20}$. The result is that the negative voltage across the column conductor $A_{02}$ produced by the transistor $T_{22}$ gives an incorrect column selection at the wrong instant. This has been prevented in the sensor according to FIG. 1 by giving the non-selected conductors of the column conductors $A_{01} \ldots A_{0X}$ the voltage $+U_6$ so that the column conductors $A_{01} \ldots A_{0X}$ have a defined voltage. The free location of the row conductors $A_{10} \ldots A_{Y0}$ which are not selected does not present any problems because in the manner described the transient phenomena are admissible within the signal blanking period.

The voltage $+U_6$ on the non-selected conductors of the column conductors $A_{01} \ldots A_{0X}$ not only provides the described advantage but also the advantage that capacitors not shown which occur between the base and the emitter of the transistors $T_{11} \ldots T_{YX}$ and which may have a value of, for example, 0.4 pF do not cause any cross-over.

For the purpose of illustration there applies that the capacitors $C_{01} \ldots C_{0X}$ have a value of, for example, Y times 0.4 pF in the construction of the sensor to be described with reference to FIG. 3.

A still further reduction of interference is realized by the specific structure of the output circuit Z of the sensor according to FIG. 1. In the output conductor $A_{00}$ which is constituted by the interconnected collectors of the transistors $T_{10} \ldots T_{Y0}$, the parasitic capacitor $C_{00}$ is shown. The capacitor $C_{00}$ does not have interfering influences because, as described with reference to the output circuit Z, the voltage $+U_4$ is present at the output conductor $A_{00}$.

For the purpose of illustration there applies that the capacitor $C_{00}$ has a value of, for example Y times 0.7 pF in the embodiment of the sensor to be described with reference to FIG. 3.

The simplest embodiment of the output circuit Z while maintaining the advantages as described with reference to the possible interference reductions would be an embodiment using one transistor, for example, $T_1$ whose base is connected to a bias source providing a constant voltage while the collector is directly connected through a resistor, for example, $R_1$ to the connection with the (reference) voltage $+U_3$. The output $Z_3$ connected to the connection point of the transistor ($T_1$) and the resistor ($R_1$) would convey output pulses under the influence of the current peaks through the transistors $T_{10} \ldots T_{Y0}$ which peaks would occur from the voltage $+U_3$. A drawback of this embodiment is that the leading edge of the output pulses which is determined by the resistor occurring in the charge circuit ($R_1$, $T_1$, etc) of the pick-up elements TC is different for the different pick-up elements TC. The pick-up element ($T_1$, $C_{11}$), reckoned up to the input $Z_0$ has a different charge resistance than the farther remote pick-up element ($T_{YX}$, $C_{YX}$). This has the drawback that the pulse amplitude obtained in the output signal is not a measure for the incident light, but the integrated pulse is.

Due to the said drawbacks a better embodiment of the output circuit Z is the one in which an integrator is used. Thus, for example, the capacitor $C_1$ connected in parallel with the resistor $R_1$ might be connected in series with the only transistor $T_1$ present. The current peaks caused by the pick-up elements TC occur in an integrated form at the output $Z_3$. A drawback is that the resistor R1 is to have a low value so as to ensure that at the end of the short period when a pick-up element TC is read out through the row and column selection the capacitor $C_1$ is discharged through the resistor $R_1$ and is thus ready for the next pick-up element TC. The discharge time constant $R_1C_1$ is to be short relative to the selection period. On the other hand it is, however, desirable that the discharge time constant $R_1C_1$ is very long so as to obtain a satisfactory integration.

An improvement is the embodiment of the output circuit Z shown in FIG. 1, which comprises two integrators ($C_1$, $T_1$, $W_2$) and ($C_2$, $T_2$, $W_2$) whose capacitors $C_1$ and $C_2$ are connected through the transistors $T_1$ and $T_2$ alternatively to successive pick-up elements TC. The resistor $R_1$ only serves for making the output signal available. The slope of the leading edge of the pulsatory output signal is dependent on the resistor in the charge circuit. For the case where such a slope variation is undesirable the embodiment of the output circuit Z shown in FIG. 2 may be used.

In the output circuit Z according to FIG. 2 the output conductor $A_{00}$ connected to the input $Z_0$ of the pickup panel described with reference to FIG. 1 is connected to the emitters of three transistors $T_3$, $T_4$ and $T_5$. The collectors of the transistors $T_3$, $T_4$ and $T_5$ are each connected to a terminal of a capacitor $C_3$, $C_4$ and $C_5$, respectively, the other terminal of which is connected to ground. The junction of the capacitor $C_3$ and the transistor $T_3$ is connected to a cathode of a diode $D_5$ and to a gate electrode of a field effect transistor $T_6$. Likewise the transistors $T_4$ and $T_5$ are connected to diodes $D_6$ and $D_7$, respectively and to field effect transistors T7 and T8. The interconnected drain electrodes of the transistors $T_6$, $T_7$ and $T_8$ are connected through a resistor $R_2$ to a connection conveying a voltage $+U_7$ and are directly connected to the output $Z_3$. The anode of the diode $D_5$ is connected directly, that of the diode $D_7$ is connected through a delay circuit $E_1$ and that of the diode $D_6$ is connected through a second delay $E_2$ to an output of a voltage source $W_3$. The base of the transistor $T_4$ is connected directly, that of the transistor $T_3$ is connected through a delay circuit $E_3$ and that of the transistor $T_5$ is connected through a second delay circuit $E_4$ to an output of a voltage source $W_4$. The source electrode of the field effect transistor $T_8$ is connected through a resistor $R_3$ to the output of a voltage source $W_5$. The source $W_5$ is furthermore connected through a delay circuit $E_5$ and a resistor $R_4$ to the source electrode of the field effect transistor $T_7$. The connection point of the delay circuit $E_5$ and the resistor $R_4$ is connected through a delay circuit $E_6$ and a resistor $R_5$ to the source electrode of the transistor $T_6$. The voltage sources $W_3$, $W_4$ and $W_5$ provide de voltages $M_3$, $M_4$ and $M_5$ at the outputs under the control of the synchronizing signal S applied thereto. The voltages $M_3$, $M_4$ and $M_5$ have a pulsatory variation relative to a mean value of $+U_8$, $+U_9$ and $+U_{10}$, respectively. For the pulsatory variations there applies, for example, that $M_3$: $U_8(=0.5\ V) \pm 1.5\ V$, $M_4$: $U_9\ (= 5V) \pm 0.3\ V$ and $M_5$: $U_{10}\ (= 7.5\ V) \pm 1.5\ V$, while for the constant direct voltage $+U_7$ there applies that $U_7 = 12\ V$. The voltages $M_3$ and $M_4$ have a positively directed pulse having a duration of $\tau$ which is equal to the delay times of the delay circuit $E_1 \ldots E_6$ while the voltage $M_5$ has a negatively directed pulse. A pulse repetition period of 3 $\tau$ results from the voltages $M_3$, $M_4$ and $M_5$.

The time $\tau$ indicated in FIG. 2 corresponds to the time when one of the pick-up elements TC of FIG. 1 is connected through one of the transistors $T_{10} \ldots T_{Y0}$ to the output conductor $A_{00}$. For the time $\tau$ given in FIG. 2 there applies that the voltage $M_3$ maintains the diode $D_5$ conducting, the voltage $M_4$ maintains the transistor $T_4$ conducting and the voltage $M_5$ maintains the field effect transistor $T_8$ conducting. The result is that the source $W_3$ active as a reference voltage source provides the reference voltage of $U_8 = 8.5\ V + 1.5\ V = 10V$ for the capacitor $C_3$. The current derived from the input $Z_0$ is derived through the transistor $T_4$ from the capacitor $C_4$ while the conductance of the field effect transistor $T_8$ which is determined by the voltage across the capacitor $C_5$ provides a voltage drop across the resistor $R_2$. During the next time duration $\tau$ the transistor $T_3$, the field effect transistor $T_7$ and the diode $D_7$ will conduct while subsequently the field effect transistor $T_6$, the diode $D_6$ and the transistor $T_5$ will conduct. Instead of using the delay circuits $E_1 \ldots E_6$ the sources $W_3$, $W_4$ and $W_5$ may be provided with three outputs which convey 120° phase-shifted voltages.

The result is that in a cycle of three stages the capacitor $C_3$, $C_4$ or $C_5$ is charged to the reference voltage, subsequently undergoes a discharge and is then connected to the output $Z_3$. Since the field effect transistors $T_6$, $T_7$ and $T_8$ are provided with an insulated gate electrode, the charge of the capacitors $C_3$, $C_4$ and $C_5$ upon their interconnection to the output $Z_3$ is not influenced. Thus the resistor $R_2$ is connected in the output circuit Z shown in FIG. 2 to a charge measuring circuit which comprises the transistors $T_6$, $T_7$ and $T_8$ in series with the resistors $R_5$, $R_4$ and $R_3$ and the source $W_5$. Other embodiments of the discharge measuring circuit ($T_6$, $T_7$, $T_8$, $W_5$) are alternatively possible. In the embodiments shown in FIG. 2 not only the leading edge slope variation is eliminated, but an output signal is obtained whose value is constant throughout the selection period.

FIGS. 3*a* to 3*d* show an embodiment of a pick-up panel shown in FIG. 1 with the pick-up elements TC integrated in a semiconductor body. FIG. 3*a* is an elevational view of part of the semiconductor body. FIG. 3*b* shows a partial cross-section of the semiconductor body taken on a line $K_1$, $K_2$. FIGS. 3c and 3d show transversely to the line $K_1$, $K_2$ cross-sections which are taken on a line $L_1$, $L_2$ and Q1, Q2. The relationship between the different crosssections is denoted by L, Q and K.

FIGS. 3*a* to 3*d* show that the semiconductor body is built up of a substrate of p-type semiconductor material on which compartments of n-type material are formed by separation diffusions of $p^{++}$ material. In some compartments a so-called buried layer of $n^+$ material as commonly used for coupling purposes is provided. In the compartments islands have been formed $p^+$ and $n^{++}$ material. The plus and minus notations used for the semiconductor material n and p indicates a more or less strong concentration of donors or acceptors. Different concentrations have been emphasized by means of different line types and thicknesses in FIGS. 3*a* to 3*d*. In the compartment the *n*-layer, the buried $n^+$ layer and a comb-shaped $n^{++}$ island constitute a common collector (FIGS. 3*a* and 3*b*). A transparent insulating layer of, for example, silicon oxide not shown is provided across the semiconductor body, which layer is provided with connection apertures indicated in FIG. 3a by rectangles provided with diagonals. Electrically conducting strips of, for example, aluminum are provided on the insulating layer and the connection apertures. The strips are denoted by the references used in FIG. 1 for the conductors and connections A. In FIGS. 3*b*, 3*c* and 3*d* the base islands of the transistors $T_{20}$, $T_{21}$ and $T_{22}$ are denoted by *b*, and emitter islands are denoted by e and the collector islands denoted by *c* before the reference T.

The column conductors $A_{01}$, $A_{02}$ etc. are formed as conducting strips while the row conductors $A_{10}$, $A_{20}$, etc. are formed as a common comb-shaped collector island extending into the compartment $cT_{21} = cT_{22} = \ldots$ which has a connection having a short strip, (for example $A_{20}$ in FIGS. 3*a*, 3*b* and 3*c*). As compared with an embodiment using two groups of strips there is the advantage that intricate crossings requiring much space are prevented. In this case there applies that the common collector island $cT_{21} = cT_{22} = \ldots$ has a larger resistance than an aluminum strip. Per pick-up element TC in a row the resistance of the collector island $cT_{21}$, $cT_{22} \ldots$ may be, for example, 30 Ohms. The said charge resistance for the first or the last pick-up element in a row has therefore increased by a value of (X - 1) times 30 Ohms. If the comb-shaped $n^{++}$ island in the compartments were subdivided, the resistance would be twice as large. By using the signal integration in the output circuit Z of FIG. 1, the resistance does not lead to an inadmissable distortion of the output signal. The distortion becomes manifest in a different pulse slope in the output signal. For the output circuit Z according to FIG. 2 the distortion is completely prevented by the separation between signal integration and passing on to the output $Z_3$.

The base-collector capacitors $C_{11} \ldots C_{YX}$ of FIG. 1 are formed in FIGS. 3*b* and 3*d* at the area of the transitions between the $p^+$ base island on the one hand, for example, $bT_{21}$ and on the other hand the $n^{++}$ island $cT_{21}$ and the *n*-layer in the compartment. The capacitors $C_{11} \ldots C_{YX}$ have been rendered as large as possible by the $n^{++}$ island overlapping the base islands and a satisfactory photosensitivity is obtained by passing the light-inpermeable aluminum strip of the column conductor $A_{01}$ over a narrow part. The unwanted base-emitter capacitance between the emitter island $eT_{21}$ and the base island $bT_{21}$ is as small as possible. By extending the collector island, for example $cT_{22}$ of FIG. 3*b* directed beyond the base island $bT_{22}$ to the base island $bT_{21}$ in an overlapping manner it has been achieved that less stringent accuracy requirements are necessary for forming the base islands through diffusions. In summary the common overlapping $n^{++}$ collector island provides the advantages of a smaller resistance, a greater photosensitive capacitance and less stringent accuracy requirements for the base diffusion.

The parasitic capacitors $C_{10} \ldots C_{Y0}$ described with reference to FIG. 1 occur in an integrated form between the transition of the *n*-layer and the $n^+$ layer to the $p^-$ substrate and of the n layer to the $p^{++}$ separation diffusions.

The transistors $T_{10} \ldots T_{Y0}$ of FIG. 1 are formed in a simple manner in their own compartment which is at right angles to the compartments of the row conductors $A_{10} \ldots A_{Y0}$. The collectors $cT_{10}$, $cT_{20}$ etc. are interconnected by a single aluminium strip as the output conductor $A_{00}$.

Although only the embodiment of the pick-up elements TC and the transistors $T_{10} \ldots T_{Y0}$ is given as being integrated in a semiconductor body, the scanning generators $G_Y$ and $G_X$ may alternatively be integrated therein.

The integrated embodiment of the sensor shown in FIGS. 3*a* to 3*d* is an embodiment employing so-called bipolar transistors. This is especially of importance for the transistors $T_{10} \ldots T_{Y0}$. In fact is has been described hereinbefore that the resistance in the charge circuit of a pick-up element TC, for example ($T_{11}$, $C_{11}$) is to be so low that the capacitor $C_{11}$ at the end of the selection period is charged to the reference voltage. However, when the charge resistance is so large that the reference voltage is not achieved the remaining charge shortage produces a cross-over at the next selection. Since the charge resistance is also determined by the resistance of the conducting transistor $T_{10}$, $T_{20} \ldots$ or $T_{Y0}$ it is important to render it as low as possible. Bipolar transistors have a negligible resistance in contrast with field effect transistors, for example, MOS transistors which have a considerable resistance between the drain and source electrodes. When forming the transistors $T_{10} \ldots T_{Yo}$ as field effect transistors cross-over phenomena may occur so that the bipolar construction is by far preferred.

What is claimed is:

1. A sensor provided with a pick-up panel formed with a cross-bar system of row and column conductors and pick-up elements occurring between intersections, said conductors being connected to outputs of row and column scanning generators each applying successive pulses with a reference voltage to the outputs, said panel being connected to an output circuit for applying an output signal to an output of the sensor through a row and column selection, a plurality of row selection transistors having bases, collectors and emitters, the outputs of the row scanning generator being separately connected to the bases of said row selection transistors, the emitter of each row selection transistor being connected to a separate row conductor, each output of the row scanning generator thereby being connected to a correspnding row through the base and emitter of a corresponding row selection transistor, means for interconnecting the collectors of said row selection transistors and for connecting said interconnected collectors to the output circuit, said row scanning generator providing each row selection transistor base with a D.C. bias during the scanning of a corresponding row.

2. A sensor as claimed in claim 1, provided with pick-up elements formed with a photosensitive transistor whose emitter is connected to one of the column conductors and whose collector is connected to one of the row conductors, wherein the outputs of the column scanning generator convey a predetermined voltage cutting off the said transistors in the temporary absence of the said pulse with the reference voltage.

3. A sensor as claimed in claim 1, wherein said interconnected collectors are connected to an emitter of at least one transistor present in the output circuit, the base of said transistor being connected to a bias source and its collector being coupled to the output of the sensor.

4. A sensor as claimed in claim 3, wherein an integrator with a capacitor and a reference voltage source is provided in the output circuit between the output of the sensor and the collector of the said transistor, said integrator being connected to the pick-up elements through the selection with the row and column scanning generator.

5. A sensor as claimed in claim 4, wherein the output circuit has two integrators whose capacitors are alternately connected to successive pick-up elements or are connected to the reference voltage of the voltage source.

6. A sensor as claimed in claim 4, wherein the output circuit includes three integrators whose capacitors are connected alternately in a cycle to the reference voltage source, to one of the pick-up elements and to a charge measuring circuit connected to the output.

7. A sensor as claimed in claim 1, wherein the sensor is at least partly integrated in a semiconductor body, the rows of pick-up elements formed as transistors being provided in compartments formed by separation diffusions, the row conductor being formed as a common extending collector island in the compartment and the column conductor being provided as a conducting strip on the semiconductor body.

8. A sensor as claimed in claim 7, wherein said collector island is provided in an overlapping manner across separated base islands of the transistors in the pick-up elements.

9. A sensor as claimed in claim 7, wherein said transistors connected to the row scanning generator are formed in one compartment which is at right angles to the compartments of the rows, while the connection between the collectors is provided as a conducting strip on the semiconductor body.

* * * * *

UNITED STATES PATENT AND TRADEMARK OFFICE
CERTIFICATE OF CORRECTION

PATENT NO. : 3,919,469
DATED : November 11, 1975
INVENTOR(S) : WOLFDIETRICH GEORG KASPERKOVITZ It is certified that error appears in the above-identified patent and that said Letters Patent are hereby corrected as shown below:

Col. 2, line 33, "and" should be --to--;
line 64, "$M_1$ and $M_1$" should be --$M_1$ and $\overline{M}_1$--;
line 67, "$M_1$ and $M_1$" should be --$M_1$ and $\overline{M}_1$--;
Col. 3, line 5, "$M_2$ and $M_2$" should be --$M_2$ and $\overline{M}_2$--;
line 6, "$M_2$ and $M_2$" should be --$M_2$ and $\overline{M}_2$--;
line 8, "$M_2$" should be --$\overline{M}_2$--;
line 33, "and $M_1$" should be --and $\overline{M}_1$--;
line 36, "$M_2$ and $M_2$" should be --$M_2$ and $\overline{M}_2$--;
Col. 5, line 24, "$M_1$" should be --$\overline{M}_1$--;

UNITED STATES PATENT AND TRADEMARK OFFICE
CERTIFICATE OF CORRECTION

PATENT NO. : 3,919,469

DATED : November 11, 1975

INVENTOR(S) : WOLFDIETRICH GEORG KASPERKOVITZ

It is certified that error appears in the above-identified patent and that said Letters Patent are hereby corrected as shown below:

Col. 7, line 16, "$T_X$" should be --$T_{YX}$--;

Col. 8, line 48, "alternatively" should be --alternately--;

Claim 1, line 16, "correspnding" should be --corresponding--;

Signed and Sealed this

*Twenty-ninth* Day of *November 1977*

[SEAL]

*Attest:*

RUTH C. MASON
*Attesting Officer*

LUTRELLE F. PARKER
*Acting Commissioner of Patents and Trademarks*